May 13, 1952 W. H. ZOLLINGER 2,596,353
PRESSURE VESSEL
Filed July 5, 1947 3 Sheets-Sheet 1
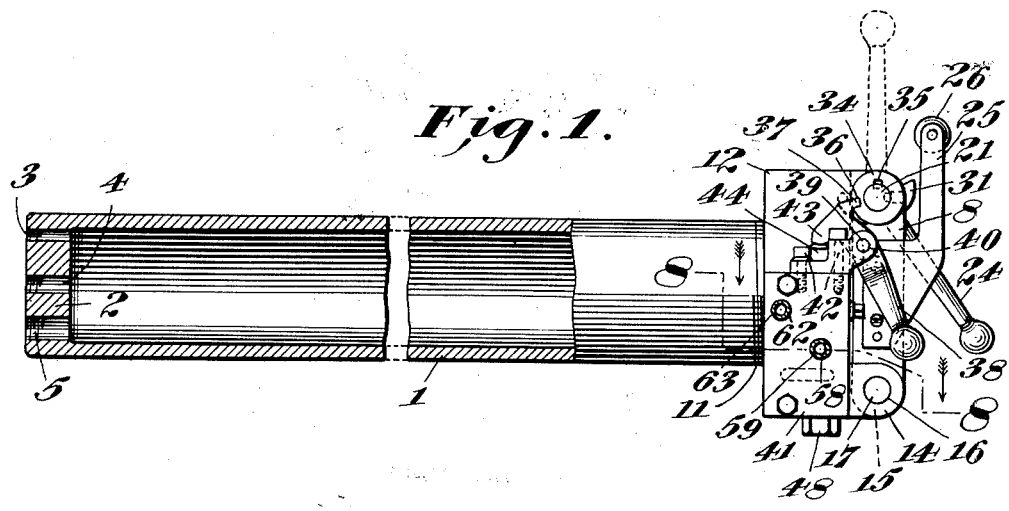
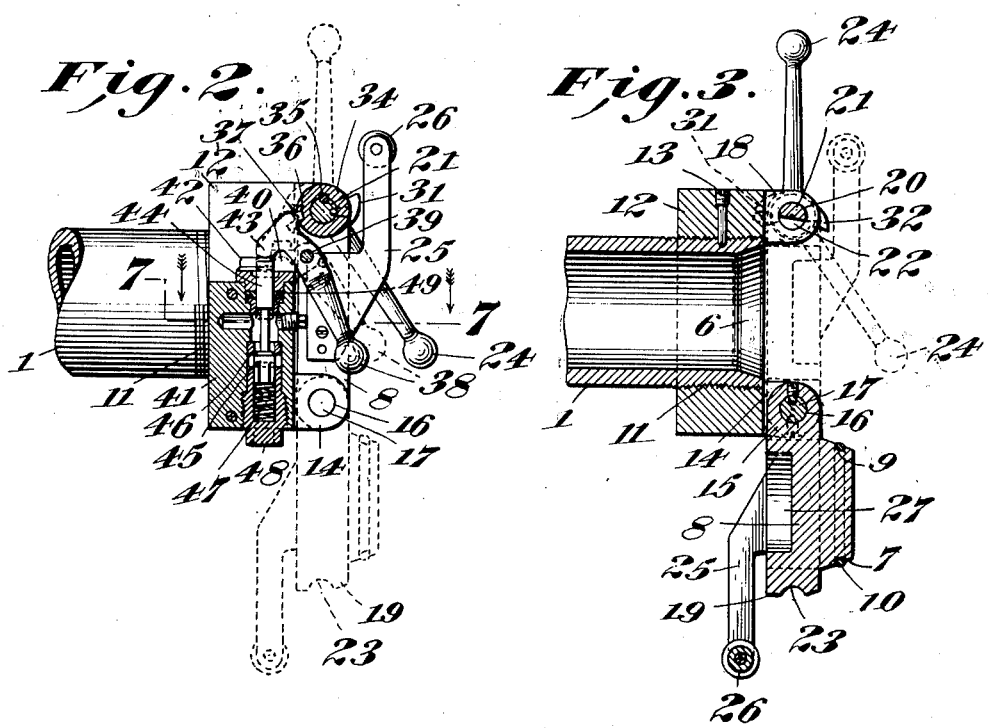
Inventor
Walter H. Zollinger.
By R. S. A. Dougherty
Attorney May 13, 1952 — W. H. ZOLLINGER — 2,596,353
PRESSURE VESSEL
Filed July 5, 1947 — 3 Sheets-Sheet 2
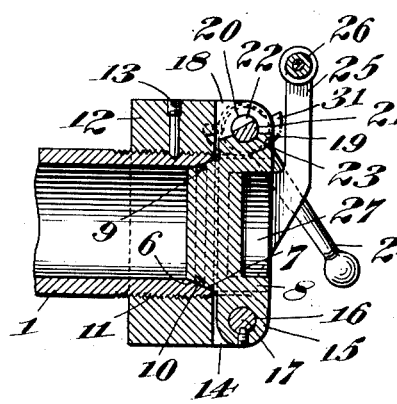
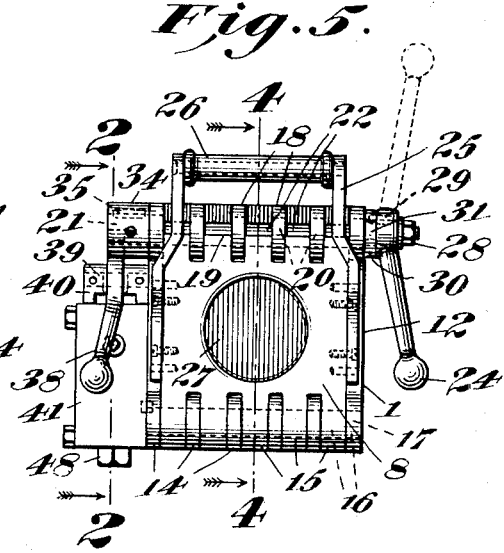
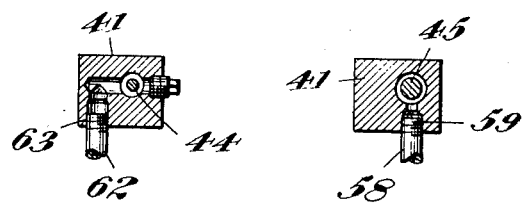
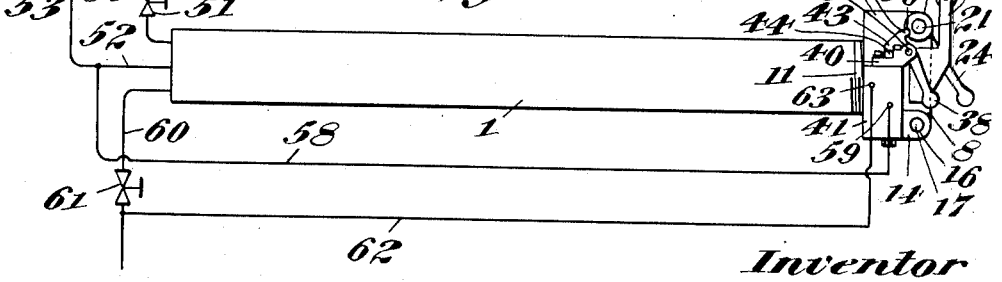
Inventor
Walter H. Zollinger
By R. S. C. Dougherty
Attorney

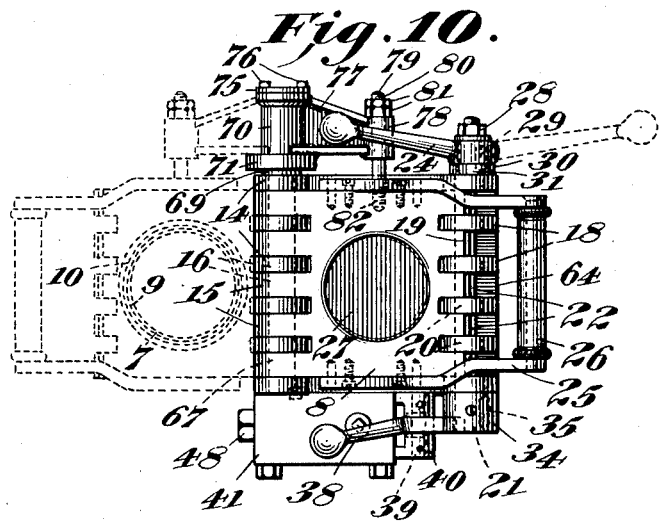
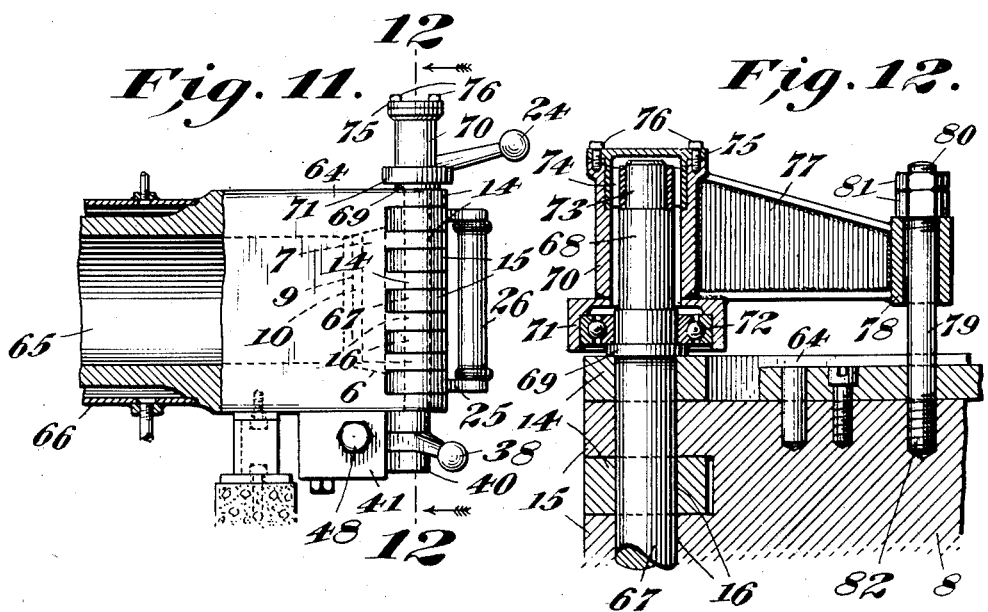
Inventor
Walter H. Zollinger
By R. S. C. Dougherty
Attorney

Patented May 13, 1952

2,596,353

UNITED STATES PATENT OFFICE 2,596,353

PRESSURE VESSEL

Walter H. Zollinger, Bethlehem, Pa., assignor to Bethlehem Steel Company, a corporation of Pennsylvania Application July 5, 1947, Serial No. 759,039

25 Claims. (Cl. 18—7)

This invention relates broadly to pressure vessels used in vulcanizing plastic materials which are subjected to very high pressures and more especially to a quick acting door closure therefor which will allow quick access to the contents of the vessel immediately upon the release of the pressure in the vessel.

A further object of the invention relates to the operating means for opening and closing the door and the manner of locking the door in its closed position.

Another object of the invention relates to a safety device for the vessel. Should the operator by mistake try to admit pressure to the vessel when it is not in the full locked position the interlocking valve will by-pass the same and prevent pressure from building up in the vessel.

A further object of my invention is to provide an auxiliary support for large and heavy doors during the opening and closing operations.

Other objects of my invention will appear hereafter.

Having thus given a general description of the objects of my invention I will now in order to make the same more clear, refer to the annexed three sheets of drawings forming a part of this specification and in which like characters of reference indicate like parts.

Figure 1 is a side elevation of a pressure vessel embodying my invention with a portion of the vessel shown in section.

Fig. 2 is a vertical section through the interlocking valve casing at the closure end of the pressure vessel taken on the line 2—2 of Fig. 5.

Fig. 3 is a vertical longitudinal section through the closure end of the pressure vessel taken on the line 4—4 of Fig. 5, but showing the door in the open position in full lines and in the closed position in dotted lines.

Fig. 4 is a vertical longitudinal section through the closure end of the pressure vessel taken on the line 4—4 of Fig. 5 showing the door in the closed position and locked.

Fig. 5 is a front end elevation.

Fig. 6 is a side elevation of the opposite side of the closure end of the pressure vessel to that shown in Fig. 1 showing the stops for limiting the movement of the locking lever.

Fig. 7 is a transverse section through the interlocking valve casing taken on the line 7—7 of Fig. 2.

Fig. 8 is a transverse section through the interlocking valve casing taken on the line 8—8 of Fig. 1.

Fig. 9 is a diagrammatic view showing the pipe connections to the pressure vessel and the valves for controlling the flow of fluid pressure to and from the same.

Fig. 10 is a front end elevation of a modification in which the door is provided with a jib-crane to act as an auxiliary support for the door during the opening and closing operations.

Fig. 11 is a side elevation of closure end of the pressure vessel shown in Fig. 10 with parts in section, and Fig. 12 is an enlarged vertical section of the jib-crane and adjacent parts showing the manner of mounting the same taken on the line 12—12 of Fig. 11.

Referring now to the various characters of reference on the drawing and first to Figs. 1 to 9 inclusive, the numeral 1 indicates the pressure vessel of cylindrical shape having one end closed as at 2 provided with threaded openings 3, 4 and 5 for receiving pipe connections for the fluid pressure to and from the vessel. The other end of the cylindrical pressure vessel is open and provided on its inner surface with a tapered door jamb surface 6 for receiving the tapered outer surface 7 of a door 8 having an annular groove 9 for receiving a gasket 10 to prevent the fluid from escaping from the vessel. The outer surface of the end of the pressure vessel adjacent to the tapered door jamb is threaded as at 11 for receiving a door case 12 which is further secured to the end of the cylindrical pressure vessel by means of a set bolt 13. The bottom forward edge portion of the door case 12 is formed with a plurality of spaced hinge lugs 14 between which the hinge lugs 15 of the door 8 are mounted each having registering openings 16 for receiving a hinge bolt 17. The upper outer edge of the door case 12 has a plurality of spaced ears 18 between which the serrated swinging edge 19 of the door is adapted to be latched. The spaced ears 18 have registering apertures 20 for receiving a locking bolt 21 which is journaled therein, and said locking bolt is formed with cut out segments between the spaced ears 18 as at 22. The serrated swinging edge 19 of the door which is adapted to be latched is somewhat shorter than the thickness of locking bolt 21 and is provided with an arc shaped recess as at 23 for engaging the locking bolt 21 when the door is in the locked position as indicated in Fig. 4 when the locking lever 24 is in the lowered position, but will allow the door to be opened when the locking bolt is rotated and the locking lever 24 raised to the vertical position as indicated in full lines in Fig. 3 to allow the projecting serrated swinging edge 19 of the door to pass through the cut out segment portions 22 of the locking bolt 21.

A bail 25 is secured to opposite sides of the door and extends beyond one edge of the same and is provided with a handle 26 by means of which the door may be swung open or closed manually when it is in the unlocked position and to reduce the weight of the door it may be provided with an annular recess 27.

The locking lever 24 is secured to the locking bolt 21 by means of a nut 28 and is further keyed thereto at 29 together with a washer 30 which is provided with stop projections 31 and 32 for engaging a stop pin 33 for limiting the rotation of the locking bolt 21. The other end of the locking bolt 21 has a tubular sleeve 34 keyed thereto as at 35 and is provided with a recess 36 for receiving a tooth 37 extending from the upper end of an interlocking release lever 38 which is pivoted as at 39 to a bracket 40 mounted on the upper end of a valve casing 41 by means of bolts 42. The interlocking release lever 38 is also provided at its upper end with a rocking arm 43 for engaging the upper end of the stem 44 of a valve 45 which is normally held on its valve seat 46 by means of a spring 47 which is retained in position by means of a threaded socket member 48 that can be removed for cleaning while the stem 44 is provided with a bland 49 to prevent leakage.

As indicated diagrammatically in Fig. 9 an air vent pipe 50 is connected to the threaded opening 3 in the closed end 2 of the pressure vessel and controlled by a valve 51. Threaded opening 4 is connected by a pipe 52 extending to a branch pipe 53 connected to a water pipe 54 controlled by a valve 55 and to a high pressure steam pipe 56 controlled by a valve 57. Pipe 52 is also connected by means of a pipe 58 to a port 59 formed in the valve casing 41 and during the vulcanizing operation the pressure in the pipe 58 holds the valve 45 closed. The threaded opening 5 is connected to an exhaust pipe 60 controlled by a valve 61. Said exhaust pipe 60 has a by-pass pipe connection 62 extending to a port 63 formed in the valve casing 41.

The operation of the device is as follows: Assuming that the door is locked and the parts are in the position shown in Figs. 1, 2, 4, 5, 6 and 9. the interlocking valve 45 is closed by pressure of the spring 47 beneath the valve and the vent pipe valve 51 is open and the high pressure valve 57 and the exhaust valve 61 are closed, valve 55 is then opened until the pressure vessel is filled with water, valve 55 is then closed and high pressure valve 57 is opened and the vent pipe valve 51 closed and the vessel subjected to 3000 to 5000 lbs. pressure per square inch, which may be considerably more in large sized pressure vessels, to vulcanize the plastic material. During the vulcanizing operation the pressure in the vessel by means of the pipe connection 58 acts on the interlocking valve 45 keeping it closed tight and making it impossible to move the interlocking release lever 38. After the high pressure valve 57 has been closed and exhaust valve 61 opened and the pressure released the interlocking release lever 38 can be pulled towards the operator disengaging the tooth 37 from the recess 36 in the tubular sleeve 34 and making it possible to swing the locking lever 24 up into the vertical unlocked position for unlocking the door 8. As the locking bolt 21 is rotated the tooth 37 will ride over the outer surface of the sleeve 34 and will be held in that position by the weighted end of the lever thereby holding the interlocking valve 45 open until the locking lever 24 is again swung downward into the locking position.

For all positions of the interlocking release lever 38 with the exception of the fully locked position the interlocking valve 45 is kept open. Should the operator by mistake try to admit pressure to the vessel when the interlocking valve 45 is open it will by-pass the water and high pressure and prevent pressure from building up in the vessel.

For the smaller sized pressure vessels the doors are manually operated to swing vertically for opening or closing the door by means of the handle 26 of the bail when the door is unlocked as indicated in Fig. 3.

In larger sized pressure vessels where the pressure is considerably greater the doors may weigh as much as five or six thousand pounds and are obviously too heavy to lift manually; when this is the case it is desirable to hinge the door to swing horizontally and to provide an auxiliary means to help support the door during the opening and closing operations as indicated in the modification shown in Figs. 10 to 12 inclusive.

In this modification the door and numerous parts are similar to those shown in Figs. 1 to 9 and where they occur the same reference numerals will apply thereto. In these larger sized pressure vessels it is desirable to forge the door case 64 integral with the body of the pressure vessel 65 which is surrounded with a jacket 66. The hinge bolt 67 is disposed vertically and extends above the door case as at 68 and is provided with a collar 69 integral therewith for engaging the top of the hinge lug 14 of the door case 64. Upon the extending end 68 of the hinge bolt 67 is mounted a jib-crane comprising a cylindrical portion 70 mounted on the extending end 68 which is enlarged at its lower end as at 71 to receive a ball bearing 72 while upon the upper end 73 of 68 which is reduced slightly is mounted a roller bearing 74. The upper end of the cylindrical portion 70 is provided with a cap 75 which is secured thereto by means of bolts 76. The cylindrical portion 70 is provided with an extending arm 77 with a tubular outer end 78 for receiving a stud bolt 79, the upper end of which is threaded as at 80 to receive nuts 81 to act against the upper end of the tubular portion 78 while the lower end of said stud bolt 79 is threaded as at 82 and secured to the top central portion of the door 8. In this manner when the door is unlocked the operator by means of the bail handle 26 can easily swing the hinged door horizontally and the jib-crane will form an auxiliary support therefor, otherwise the operation of the door is the same as that described for Figs. 1 to 9 inclusive.

Although I have shown and described my invention in considerable detail, I do not wish to be limited to the exact and specific details shown and described, but I may use such substitutions, modifications or equivalents thereof, as are embraced within the scope of my invention or as pointed out in the claims.

Having thus described my invention, what I claim as new and desire to secure by Letters Patent is:

1. A pressure vessel comprising a pressure chamber having an open end, a door jamb formed within the open end portion of the vessel, a door case surrounding the open end portion of the vessel, a door hinged to the door case, means for swinging the door to the open and closed positions to disengage and engage the door jamb, a locking bolt mounted for rotation on the door case for latching and unlatching the swinging edge of the door, and an interlocking release lever for holding the locking bolt to prevent rotation when the door is closed.

2. A pressure vessel comprising a cylindrical body portion having a pressure chamber open at one end, a door case surrounding the open end portion, a swinging door hinged to the door case for closing said open end, means for swinging the door to the open and closed positions, a locking bolt rotatably mounted on the door case for latching the door in the closed position, means for rotating the locking bolt for locking and unlocking the door, a valve case mounted on the door case, and an interlocking release lever pivotally mounted on the valve case for holding the locking bolt to prevent rotation of the locking bolt when the door is closed.

3. A pressure vessel comprising a cylindrical body portion having a pressure chamber open at one end, a door jamb formed within the open end portion, a door case surrounding the open end portion, a swinging door hinged to the door case adapted to engage the door jamb for closing said open end, means for swinging the door to the open and closed positions, a bolt mounted on the door case for latching the door in the closed position, a locking lever secured to the bolt for rotating the bolt to latch and unlatch the door, a valve case mounted on the door case, and an interlocking release lever pivotally mounted on the valve case adapted for holding the bolt against rotation when the door is closed and for releasing the bolt to open the door.

4. A pressure vessel comprising a cylindrical body portion having a pressure chamber open at one end, a door jamb formed within the open end portion, a door case surrounding the open end portion, a swinging door hinged to the door case adapted to engage the door jamb for closing said open end, means for swinging the door to the open and closed positions, a bolt mounted on the door case for latching the door in the closed position, a locking lever secured to one end of the bolt for rotating the bolt to latch and unlatch the door, a valve case secured to the door case, and an interlocking release lever pivotally mounted on the door case for holding the bolt to prevent rotation when the door is closed.

5. A pressure vessel comprising a cylindrical body portion having a pressure chamber open at one end and closed at the opposite end having threaded openings for pipe connections with means for controlling fluid pressure to and from the chamber, a door jamb formed within the open end portion of the cylindrical body, a door case surrounding the open end portion of the chamber, a swinging door hinged to the door case, means for swinging the door to the open and closed positions, a locking bolt mounted on the door case adapted to be rotated to lock and unlock the swinging edge of the door, an interlocking release lever for holding the bolt when the door is locked to prevent rotation, and a valve connected to the fluid pressure pipe connections and actuated by the interlocking release lever adapted to be opened to by-pass the fluid pressure for the pressure chamber to an exhaust connection when the door is unlocked.

6. A pressure vessel comprising a cylindrical body portion having a pressure chamber open at one end and closed at the opposite end, means for controlling the supply of fluid pressure to and from the chamber, a door jamb formed within the open end portion of the cylindrical body, a door case surrounding the open end portion of the chamber, a door hinged to the door case, means for swinging the door to the open and closed positions, a bolt mounted on the door case adapted to be rotated to lock and unlock the door, an interlocking release lever having means for holding the bolt when the door is locked to prevent rotation, and a valve actuated by the interlocking release lever adapted to by-pass the fluid pressure for the pressure chamber to an exhaust connection when the door is unlocked.

7. A pressure vessel comprising a cylindrical body portion having a pressure chamber open at one end, a door case surrounding the open end portion having a forward edge, spaced hinge lugs extending from the forward edge at one side of the door case, a door having spaced hinge lugs adapted to be inserted between the hinge lugs of the door case, registering openings through the hinge lugs for receiving a hinge bolt, serrations formed in the swinging edge of the door, means for swinging the door to the open and closed positions, a plurality of spaced ears extending from the forward edge of the door case adjacent to the serrations formed in the swinging edge of the door when closed, said serrations and ears having registering apertures, a locking bolt mounted for rocking movement in the apertures and having cut out segments between the spaced ears adapted to latch and unlatch the serrated edge of the swinging door, and means to prevent rocking movement of the locking bolt when the door is latched.

8. A pressure vessel comprising a cylindrical body portion having a pressure chamber open at one end, a door jamb formed within the open end portion, a door case surrounding the open end portion of the vessel having a forward edge, a door hinged to the forward edge of the door case having its swinging edge serrated and formed with arc-shaped recesses, a plurality of spaced ears extending from the forward edge of the door case opposite to the door hinge having registering apertures, a locking bolt mounted for rocking movement in the registering apertures and the arc shaped recesses in the swinging edge of the door when closed, cut out segments in the locking bolt between the spaced ears, means for rocking the locking bolt to latch and unlatch the swinging edge of the door, and means to prevent rocking movement of the bolt when the door is latched.

9. A pressure vessel comprising a cylindrical body portion having a pressure chamber open at one end, a door jamb formed within the open end portion of the vessel, a door case surrounding the open end portion of the vessel, a door hinged to the door case adapted to engage the door jamb for closing said open end, means for swinging the door to the open and closed positions, a bolt for latching the swinging edge of the door in the closed position, a locking lever attached to the bolt for rocking said bolt to latch and unlatch the door, a sleeve secured to the bolt having a recess formed therein, and an unlocking release lever having a tooth for engaging the recess for holding the bolt against rotation when the door is closed.

10. A pressure vessel comprising a cylindrical body portion having a pressure chamber open at one end, a door jamb having a beveled surface formed within the open end portion of the vessel, a door case surrounding the open end portion of the vessel, a door hinged to the door case having a valve of frusto-conical shape adapted to engage the door jamb for closing said open end, an annular groove formed in the periphery of the frusto-conical valve, a gasket in the annular groove adapted to form a sealing means between the valve and the door jamb, means for swinging the door to the open and closed positions, a bolt mounted on the door case for latching the swinging edge of the door in the closed position, a locking lever attached to one end of the bolt for rocking said bolt to latch and unlatch the door, a sleeve secured to the other end of the bolt having a recess formed therein, an interlocking release lever pivotally mounted adjacent to the sleeve having a tooth for engaging the recess for holding the bolt against rotation when the door is closed and to disengage the recess to open the door, and means for limiting the rocking movement of the bolt.

11. A pressure vessel comprising a cylindrical body portion having a pressure chamber open at one end and closed at the opposite end having threaded openings for pipe connections with means for controlling the fluid pressure to and from the chamber, a door jamb formed within the open end portion of the vessel, a door case surrounding the open end portion of the vessel, a door hinged to the door case, means for swinging the door to the open and closed positions to disengage and engage the door jamb, spaced ears extending from the door case, a bolt mounted for rocking movement in the ears for latching the door in the closed position, means for rocking the bolt to open and close the door, means for automatically locking the door in its closed position, fluid pressure means for holding the locking means when the door is closed, and means for limiting the rocking movement of the bolt.

12. A pressure vessel comprising a cylindrical body portion having a pressure chamber open at one end, a door jamb having a beveled surface formed within the open end portion, a door case surrounding the open end portion, a door hinged to the door case having an extending frusto-conical valve surface adapted to engage the beveled surface of the door jamb for closing said open end, means for swinging the door to the open and closed positions, a bolt mounted on the door case for latching the swinging edge of the door in the closed position, a locking lever secured to one end of the bolt for rotating the bolt to latch and unlatch the door, a sleeve mounted on the other end of the bolt, a recess formed in the sleeve, an interlocking release lever pivotally mounted adjacent to the sleeve having a tooth for engaging the recess for holding the bolt to prevent rotation when the door is closed, and means manually controlled for actuating the interlocking release lever to open the door.

13. A pressure vessel comprising a cylindrical body portion having a pressure chamber open at one end and closed at the opposite end, threaded openings in the closed end for pipe connections with means for controlling the fluid pressure to and from the chamber, a door jamb having a beveled surface formed within the open end portion of the cylindrical body, a door case surrounding the open end portion of the chamber, a door hinged to the door case having an extending frusto-conical valve surface adapted to engage the beveled surface of the door jamb for closing said open end, means for swinging the door to the open and closed positions, a bolt mounted on the door case adapted to be rotated to latch and unlatch the door, an interlocking release lever for holding the bolt when the door is locked to prevent rotation, and a valve actuated by the interlocking release lever adapted to by-pass the fluid pressure for the pressure chamber to an exhaust connection when the door is unlocked.

14. A pressure vessel comprising a cylindrical body portion having a pressure chamber open at one end and closed at the opposite end, inlet and outlet pipe connections to the closed end of the vessel having valves for controlling the supply of fluid pressure to and from the chamber, a door jamb formed within the open end portion of the cylindrical body, a door case surrounding the open end portion of the chamber having a forward edge, a door hinged to the door case having a serrated swinging edge, means for swinging the door to the open and closed positions, a plurality of spaced ears extending from the forward edge of the door case adjacent to the swinging serrated edge of the door when closed, registering apertures formed in the ears, arc-shaped recesses formed in the serrated swinging edge of the door, a locking bolt mounted for rocking movement in the apertures in the ears and the arc-shaped recesses formed in the swinging edge of the door and having cut out segments between the spaced ears adapted to latch and unlatch the swinging edge of the door, means to prevent rocking movement of the bolt when the door is latched, and means adapted to by-pass the fluid pressure for the pressure chamber to an exhaust connection when the door is unlocked.

15. A pressure vessel comprising a cylindrical body portion having a pressure chamber open at one end and closed at the opposite end, a door jamb formed within the open end portion of the vessel, a door case surrounding the open end portion of the vessel, a door hinged to the door case, means for swinging the door to the open and closed positions to disengage and engage the door jamb, means for locking the swinging edge of the door when the door is closed, inlet and outlet pipe connections to the closed end of the vessel having valves for controlling the supply of fluid pressure to and from the chamber, an interlocking valve having a pipe connection to the fluid pressure supply pipe to the pressure chamber, resilient means for normally holding the interlocking valve seated when the door is closed and the fluid pressure to the vessel is cut off, fluid pressure means from the supply pipe for retaining the interlocking valve closed when the fluid pressure is admitted into the chamber of the vessel when the door is closed, and an interlocking release lever for opening the interlocking valve to by-pass the fluid pressure for the pressure chamber to an exhaust connection when the door is unlocked.

16. A pressure vessel comprising a cylindrical body portion having a pressure chamber open at one end and closed at the opposite end, a door jamb formed within the open end portion of the vessel, a door case surrounding the open end portion of the vessel, a door hinged to the door case, means for swinging the door to the open and closed positions to engage and disengage the door jamb, means for locking the swinging edge of the door when the door is closed, inlet and outlet pipe connections to the closed end of the vessel having valves for controlling the supply of fluid pressure to and from the chamber, vent and exhaust pipe connections to the closed end of the vessel having valves for controlling the same, a valve casing attached to the door case, an interlocking valve mounted therein having a pipe connection to the fluid pressure supply pipe to the pressure chamber, resilient means for normally holding the interlocking valve seated at all times when the door is closed and the fluid pressure to the vessel is cut off, fluid pressure means from the supply pipe for retaining the interlocking valve closed when the fluid pressure is admitted into the chamber of the vessel when the door is closed, and an interlocking release lever for opening the interlocking valve to by-pass the fluid pressure for the pressure chamber to the exhaust connection when the door is unlocked.

17. A pressure vessel comprising a cylindrical body portion having a pressure chamber open at one end, a door case surrounding the open end portion having a forward edge, spaced hinge lugs extending from the forward edge at one side of the door case, a door having spaced hinge lugs adapted to be inserted between the hinge lugs of the door case, registering openings through the hinge lugs for receiving a hinge bolt, serrations formed in the swinging edge of the door, a plurality of spaced ears extending from the forward edge of the door case adjacent to the serrations formed in the swinging edge of the door when closed, said serrations and ears having registering apertures, means for swinging the door to the closed position for the serrations formed in the swinging edge of the door to be inserted between the ears, a locking bolt mounted for rocking movement in the apertures and having cut out segments between the spaced ears, means for rocking the locking bolt to latch the door when closed and to unlatch the serrated edge of the door when the cut out segments of the locking bolt register therewith, and means to prevent rocking movement of the locking bolt when the door is latched.

18. A pressure vessel comprising a cylindrical body portion having a pressure chamber open at one end, a door jamb formed within the open end portion, a door case surrounding the open end portion of the vessel having a forward edge, a door hinged to the forward edge at one side of the door case having its swinging edge serrated and formed with arc-shaped recesses, a plurality of spaced ears extending from the forward edge of the door case opposite to the hinged edge of the door to receive the serrated edge when the door is closed, registering apertures in said ears, a locking bolt mounted for rocking movement in the apertures and the arc-shaped recesses formed in the swinging serrated edge of the door, cut out segments in the locking bolt between the spaced ears, means for rocking the bolt to latch the door and to unlatch the door when the swinging edge of the door registers with the cut out segments in the locking bolt between the ears, and means to prevent rocking movement of the locking bolt when the door is latched.

19. A pressure vessel comprising a cylindrical body portion having a pressure chamber open at one end, a door jamb formed within the open end portion, a door case surrounding the open end portion of the vessel having a forward edge, a door hinged to the forward edge of the door case having its swinging edge serrated and formed with arc-shaped recesses, a plurality of spaced ears extending from the forward edge of the door case opposite to the hinge between which the serrated edge of the door is received when the door is closed, registering apertures in said ears, a locking bolt mounted for rocking movement in the registering apertures and the arc-shaped recesses formed in the swinging serrated edge of the door when closed, cut out segments in the locking bolt between the spaced ears, a locking lever attached to the bolt for rocking said bolt to latch the door and to unlatch the door when the serrated swinging edge of the door registers with the cut out segments in the locking bolt between the ears, a sleeve secured to the locking bolt having a recess formed therein, and an unlocking release lever having a tooth for engaging the recess for holding the locking bolt against rotation when the door is locked.

20. A pressure vessel comprising a cylindrical body portion having a pressure chamber open at one end and closed at the opposite end, inlet and outlet pipe connections to the closed end of the vessel having valves for controlling the supply of fluid pressure to and from the chamber, a door jamb having a beveled surface formed within the open end portion of the vessel, a door case surrounding the open end portion of the vessel, a door hinged to the door case having a valve of frusto-conical shape adapted to engage the beveled surface of the door jamb for closing said open end, an annular groove formed in the periphery of the frusto-conical shaped valve, a gasket seated in the annular groove adapted to form a sealing means between the valve and the door jamb, means for swinging the door to the open and closed positions to engage and disengage the door jamb, a locking bolt mounted for rocking movement on the door case, means for rocking the bolt to open and close the door, an interlocking release lever for holding the locking bolt against rotation when the door is latched, a valve having a pipe connection to the fluid pressure supply pipe to the pressure chamber and actuated by the interlocking release lever adapted to be opened to bypass the fluid pressure for the pressure chamber to an exhaust connection when the door is unlocked, and resilient means for normally holding the valve seated when the door is closed.

21. A pressure vessel comprising a container having a pressure chamber open at one end and closed at the opposite end, inlet and exhaust pipe connections to the pressure chamber having valves for controlling the fluid pressure to and from the pressure chamber, a swinging door for closing the open end of the pressure chamber, means for swinging the door to the open and closed positions, an interlocking release lever for automatically locking the door in the closed position, an interlocking valve having pipe connections to the fluid supply and exhaust pipes for the pressure chamber and actuated by the interlocking release lever adapted to be opened to bypass the fluid pressure for the pressure chamber to an exhaust connection when the door is unlocked, resilient means for normally holding the interlocking valve seated when the door is closed, and means for opening the interlocking valve when the door is opened.

22. A pressure vessel comprising a cylindrical body portion having a pressure chamber open at one end and closed at the opposite end, a door jamb formed within the open end portion of the vessel, a door case surrounding the open end portion of the vessel, a door hinged to the door case, means for swinging the door to the open and closed positions to disengage and engage the door jamb, means for automatically locking the swinging edge of the door when the door is closed, inlet and exhaust pipe connections having valves for controlling the supply of fluid pressure to and from the pressure chamber, an interlocking valve having pipe connections to the fluid pressure supply and exhaust pipe connections for the pressure chamber, resilient means for normally holding the interlocking valve seated at all times when the door is closed, an interlocking release lever, means actuated by the locking means for the swinging edge of the door for engaging the interlocking release lever for holding the interlocking valve open at all times to bypass the fluid pressure for the pressure chamber to the exhaust pipe connection when the door is open.

23. A pressure vessel comprising a cylindrical body portion having a pressure chamber open at one end and formed with a door jamb and closed at the opposite end, inlet and exhaust pipe connections to the pressure chamber having valves for controlling the fluid pressure to and from the pressure chamber, a door case surrounding the open end portion of the vessel, a door hinged to the door case, means for swinging the door to the open and closed positions to disengage and engage the door jamb, means for locking and unlocking the door, a valve having pipe connections to the fluid pressure supply and exhaust pipes for the pressure chamber, means for holding the valve seated at all times when the door is closed, and means actuated by the door unlocking means for holding the valve open at all times when the door is open and adapted to bypass the fluid pressure for the pressure chamber to the exhaust connection when the door is open.

24. A pressure vessel comprising a cylindrical body portion having a pressure chamber open at one end and closed at the opposite end, inlet and exhaust pipe connections to the pressure chamber having valves for controlling the supply of fluid pressure to and from the pressure chamber, a door jamb formed within the open end portion of the pressure chamber, a door case surrounding the open end portion of the pressure chamber, a door hinged to the door case, means for swinging the door to the open and closed positions to disengage and engage the door jamb, a locking bolt mounted for rocking movement on the door case, a locking lever secured to the locking bolt for rocking the locking bolt to open and close the door, a valve casing secured to the door case, a stem for the valve extending from the valve casing, pipe connections for the valve to the fluid pressure supply and exhaust pipe connections for the pressure chamber, a sleeve secured to the locking bolt having a recess formed therein, an interlocking release lever pivotally mounted on the valve casing having a tooth for engaging the recess when the door is closed and for holding the locking bolt against rocking movement, a rocking arm formed integral with the interlocking release lever adapted to engage the valve stem and open the valve to by-pass the fluid pressure for the pressure chamber to the exhaust pipe connection.

25. A pressure vessel comprising a cylindrical body portion having a pressure chamber open at one end, a door jamb formed within the open end portion of the vessel, a door case surrounding the open end portion having a forward edge, spaced hinge lugs extending from the forward edge at one side of the door case, a door having spaced hinge lugs adapted to be inserted between the hinge lugs of the door case, registering openings through the hinge lugs for receiving a hinge bolt, serrations formed in the swinging edge of the door, a plurality of spaced ears extending from the forward edge of the door case opposite to the hinge lugs having registering apertures, means for swinging the door to the closed position for the serrations formed in the swinging edge of the door to be inserted between the ears, a locking bolt mounted for rocking movement in the apertures in the ears having cut out segments between the spaced ears, a locking lever secured to the locking bolt for rocking the locking bolt to open and close the door, means for limiting the rocking movement of the locking bolt, a valve casing secured to the door case, a stem for the valve casing, pipe connections for the valve to the fluid pressure supply and exhaust pipe connections for the pressure chamber, a sleeve secured to the locking bolt having a recess formed therein, an interlocking release lever pivotally mounted on the valve casing having a tooth for engaging the recess when the door is closed and for holding the locking bolt against rocking movement, a rocking arm formed integral with the interlocking release lever adapted when actuated therewith to engage the valve stem and open the valve to by-pass the fluid pressure for the pressure chamber to the exhaust pipe connection and for disengaging the tooth of the interlocking release lever from the recess in the sleeve when said interlocking release lever is actuated, and means for rocking the sleeve for said tooth to engage the outer surface of the sleeve for holding the valve open.

WALTER H. ZOLLINGER.

REFERENCES CITED

The following references are of record in the file of this patent:

UNITED STATES PATENTS

| Number | Name | Date |
|---|---|---|
| Re. 17,962 | Harris | Feb. 10, 1931 |
| 1,208,041 | Steere | Dec. 12, 1916 |
| 1,395,014 | Rowell | Oct. 25, 1921 |
| 1,688,570 | Williams | Oct. 23, 1928 |
| 1,833,208 | Davidson | Nov. 24, 1931 |
| 1,894,017 | Bostwick | Jan. 10, 1933 |
| 2,086,266 | Heue et al. | July 6, 1937 |
| 2,128,417 | Kerr | Aug. 30, 1938 |
| 2,195,132 | Nelson | Mar. 26, 1940 |
| 2,436,566 | Goldberg | Feb. 24, 1948 |

FOREIGN PATENTS

| Number | Country | Date |
|---|---|---|
| 1,747 | Great Britain | Jan. 22, 1913 |